United States Patent
Choi et al.

(10) Patent No.: US 7,278,694 B2
(45) Date of Patent: Oct. 9, 2007

(54) ANTI-LOCK BRAKE SYSTEM WITH CONTINUOUS WHEEL SLIP CONTROL

(75) Inventors: S. Ben Choi, Ann Arbor, MI (US); Danny Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 11/213,620

(22) Filed: Aug. 26, 2005

(65) Prior Publication Data

US 2006/0055234 A1 Mar. 16, 2006

Related U.S. Application Data

(63) Continuation of application No. PCT/US2004/005970, filed on Feb. 27, 2004.

(60) Provisional application No. 60/450,900, filed on Feb. 28, 2003.

(51) Int. Cl.
*B60T 8/66* (2006.01)

(52) U.S. Cl. .................... 303/156; 303/165; 701/71

(58) Field of Classification Search ........ 303/156–158, 303/165, 175, 186, 195; 701/70, 71, 78
See application file for complete search history.

(56) References Cited

U.S. PATENT DOCUMENTS

| | | | | |
|---|---|---|---|---|
| 4,790,607 A | | 12/1988 | Atkins | 303/195 |
| 5,295,738 A | * | 3/1994 | Matsuura et al. | 303/158 |
| 5,454,629 A | | 10/1995 | Johnson | 303/156 |
| 5,553,929 A | | 9/1996 | Rivard et al. | 303/113.1 |
| 5,642,280 A | | 6/1997 | Negrin et al. | 701/1 |
| 5,642,920 A | * | 7/1997 | Luckevich et al. | 303/156 |
| 5,660,449 A | | 8/1997 | Higashimata et al. | 303/156 |
| 6,009,366 A | | 12/1999 | Burkhard et al. | 701/71 |
| 6,076,900 A | * | 6/2000 | Jung et al. | 303/156 |
| 6,161,907 A | | 12/2000 | Luckevich et al. | 303/158 |

* cited by examiner

*Primary Examiner*—Melody M. Burch
(74) *Attorney, Agent, or Firm*—MacMillan, Sobanski & Todd, LLC

(57) ABSTRACT

An anti-lock brake controller that is operable, upon detecting a potential wheel lock-up situation during a vehicle braking cycle, to cycle apply and dump valves associated with vehicle rear wheels continuously between apply and dump modes to determine an estimated maximum friction wheel slip. The controller then is further operable to utilize the estimated maximum friction wheel slip to determine reference velocities that are used to continuously control apply and dump valves associated with the vehicle front wheels to optimize vehicle braking.

18 Claims, 8 Drawing Sheets

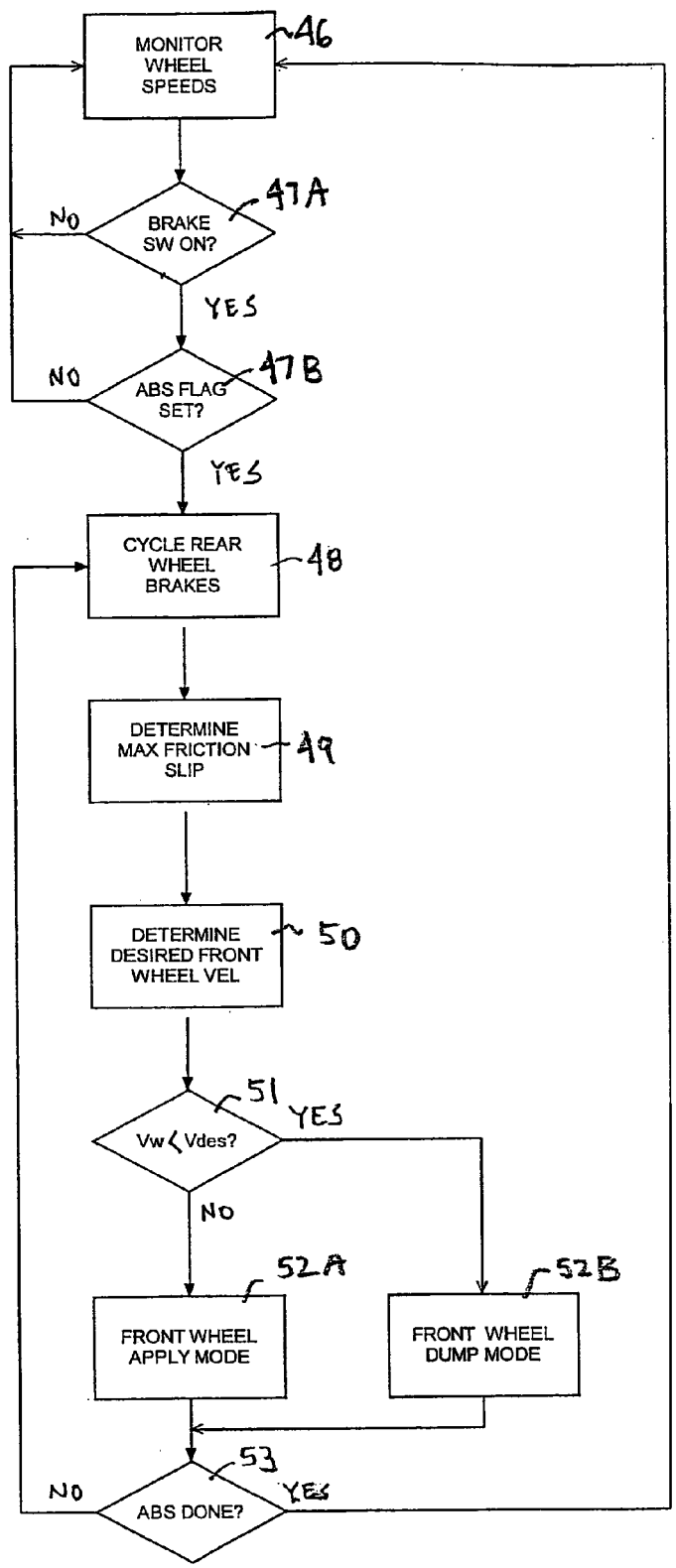
FIG. 2.1

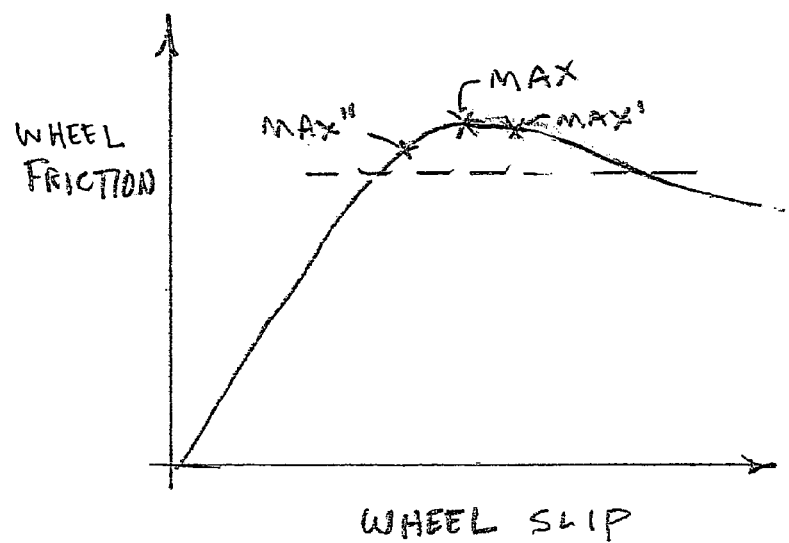
FIG. 2.2
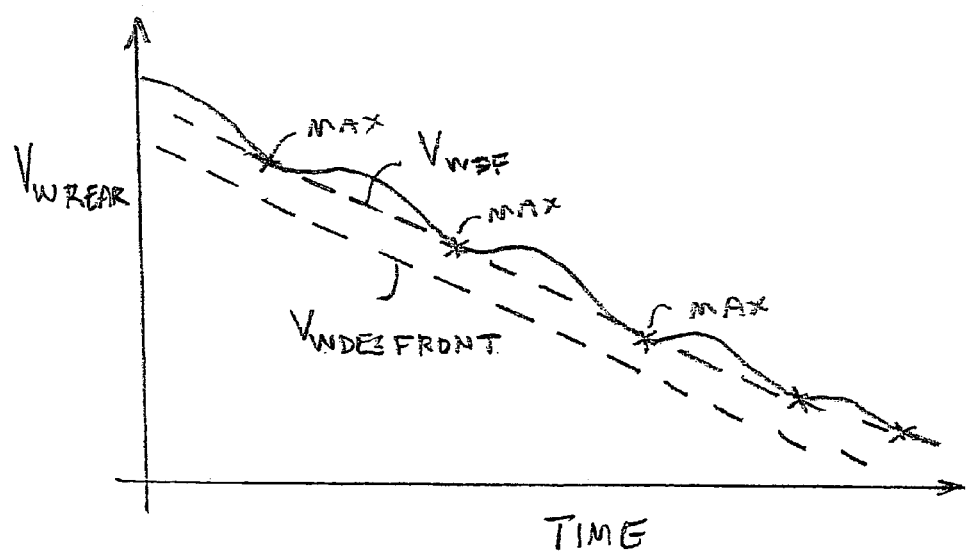
FIG. 2.3

ANTI-LOCK BRAKE SYSTEM WITH CONTINUOUS WHEEL SLIP CONTROL

CROSS-REFERENCE TO RELATED APPLICATIONS

This application is a continuation of International Application No. PCT/US2004/05970 filed Feb. 27, 2004, the disclosures of which are incorporated herein by reference, and which claimed priority to U.S. Provisional Patent Application No. 60/450,900 filed Feb. 28, 2003, the disclosures of which are incorporated herein by reference.

BACKGROUND OF INVENTION

This invention relates in general to antilock brake systems and in particular to an antilock brake system with continuous wheel slip control.

An anti-lock Brake System (ABS) is often included as standard equipment on new vehicles. When actuated, the ABS is operative to control the operation of some or all of the vehicle wheel brakes to prevent wheel lock-up during a brake application cycle. Referring now to the drawings, there is illustrated in FIG. 1a typical hydraulic brake system 10 which includes a prior art anti-lock brake control capability. The system 10 is intended to be exemplary and it will be appreciated that there are other brake control systems having more or less components. The brake system 10 shown is for a rear wheel drive vehicle. The system 10 includes a brake pedal 12 that is mechanically connected to a brake light switch 12 and a dual reservoir master cylinder 14. A first reservoir of the master cylinder 14 supplies hydraulic, fluid a front wheel broke circuit while the second reservoir provides hydraulic brake fluid to a rear wheel brake circuit.

The master cylinder first reservoir is connected to an ABS control valve 16 by a first hydraulic line 18 while the second reservoir is connected to the control valve 16 by a second hydraulic line 20. The ABS control valve 16 includes plurality of normally open and normally closed solenoid valves (not shown) and a separate source of pressurized hydraulic fluid, such as a motor driven pump (not shown). The pump is typically included within the body of the control valve 16 while the pump motor is mounted upon the exterior thereof.

The control valve 16 is connected by a first pair of hydraulic brake lines 22 and 24 to right and left front vehicle wheels 28 and 30, respectively. For the vehicle shown in FIG. 1, the front wheels 28 and 30 are non-driven but steerable. However, ABS can also be applied to vehicles having front wheel and/or all wheel drive. Similarly, a second pair of hydraulic brake lines 26 and 27 connect the control valve 16 to right and left rear vehicle wheels 32 and 33, respectively.

Typically, the control valve 16 includes a normally open solenoid valve (not shown) between each of the brake circuits and the corresponding master cylinder reservoir. Upon actuation, the valve closes to isolate the brake circuit from the master cylinder 14. Accordingly, the valve is typically referred to as an isolation valve. For optimal control of the speed of each of the vehicle wheels, each of the wheel brakes can be provided an associated isolation valve. The control valve also typically includes a first normally closed valve (not shown) for each wheel brake that connects the wheel brake cylinder with a brake fluid reservoir (not shown). Upon actuation, the first normally closed valve is opened to bleed hydraulic fluid from the wheel brake cylinder and thereby reduce the pressure applied to the wheel brake. Accordingly, the first normally closed valve is usually referred to as a dump valve. The control valve also usually includes a second normally closed valve (not shown) for each wheel brake that connects the wheel brake cylinder with a outlet of the pump. Upon actuation, the first normally closed valve is opened to supply pressurize hydraulic fluid from the pump to the wheel brake cylinder and thereby raise the pressure applied to the wheel brake. Accordingly, the second normally closed valve is usually referred to as an apply valve. Usually, the reservoir connected to the dump valves is connected to the pump inlet and thereby supplies hydraulic brake fluid to the motor driven pump.

The speed of the front wheels 28 and 30 are monitored by a first pair of wheel associated wheel speed sensors, 34 and 35, respectively. Similarly, the speed of the rear wheels 32 and 33 are monitored by a second pair of associated wheel speed sensors 36 and 37, respectively. The wheel speed sensors 34, 35, 36 and 37 are electrically connected to an ABS Electronic Control Unit (ECU) 38. The ECU 38 is also electrically connected to the bake light switch 38. Closing the brake switch 13 provides a signal to the ECU 38 that the vehicle brakes have been activated. The ECU 38 also is electrically connected to the pump motor and the actuation coils of the solenoid valves included with the control valve 16. The ECU 38 includes a microprocessor with a memory that stores an ABS control algorithm.

During vehicle operation, the microprocessor in the ECU 38 continuously receives speed signals from the wheel speed sensors 34, 35, 36 and 37. The operation of the ABS 10 is illustrated by the waveforms shown in FIG. 2. A line labeled 40 in FIG. 2a illustrates the pressure being applied to one of the wheel brake cylinders as a function of time. At $t_1$, the brake pedal 12 is depressed to begin applying pressure to the brake cylinders. The actual vehicle speed during the brake application as a function of time is illustrated by the line labeled 42 in FIG. 2b. After $t_1$, the actual wheel speed 43 begins to decrease relative to the actual vehicle speed 42. Meanwhile, the microprocessor in the ECU 38 has calculated a theoretical speed ramp, shown by the dashed line labeled 44 that represents the speed the vehicle would travel is decelerated at a predetermined maximum rate, such as 1.0 g. The microprocessor continues to monitor the speed of the wheel relative to both the actual wheel speed and theoretical speed ramp. When the microprocessor detects that the wheel deceleration has reached a predetermined threshold value, such as 1.3 g, at $t_2$, the microprocessor causes the isolation valve associated with the wheel brake to close, as illustrated in FIG. 2c, limiting the pressure applied to the wheel cylinder of a constant level $P_A$. The uncontrolled wheel brake pressure would continue to follow the dashed curve labeled 45 in FIG. 2a.

When the difference between the actual wheel speed 43 and the calculated speed ramp 44 exceeds a predetermined slip threshold $S_t$, it is an indication that a predetermined slippage is occurring between the actual wheel speed and the vehicle speed and that the wheel has potential to lock-up. This point is shown at $t_3$ in FIG. 2. At this time, the wheel speed has fallen sufficiently that it is desirable to selectively reduce the pressure of the hydraulic fluid being applied to the wheel cylinder. Accordingly, the ECU microprocessor applies a series of pulses labeled shown in FIG. 2d to the dump valve associated with the wheel cylinder to lower pressure sufficiently to cause the wheel to spin back up to the vehicle speed, beginning at $t_4$. The lowered pressure is labeled $P_B$ in FIG. 2a.

After the wheel speed attains the vehicle speed it is desirable for the ECU microprocessor to apply a series of pulses at $t_5$ to the apply valve associated with the wheel cylinder to raise the pressure. The operation of the apply valve is illustrated in FIG. 2e. These pulsed precipitate a second wheel speed departure at $t_6$. Upon correction of the second wheel speed departure with a second series of dump pulses, it is seen that the applied pressure $P_C$, while lower that the initial pressure $P_A$, is greater than the pressure $P_B$ present after correction of the first wheel speed departure. Thus, it is seen that the ABS 10 provides control over the individual wheel speeds by switching between hold, dump and apply modes of operation of the solenoid valves included in the control valve 16.

Because the speed of each wheel is monitored separately, by utilizing a different algorithm for the microprocessor in the ECU 38, the system illustrated also may function as a Traction Control System (TCS) and/or a Vehicle Stability Control (VCS) System.

SUMMARY OF INVENTION

This invention relates to an antilock brake system with continuous wheel slip control.

In a conventional ABS, the individual wheel rotational velocities are controlled by selective operation of dump and apply valves that control the wheel brake pressure applied at each of the wheels. The operation of the valves provides three modes of operation, namely, dump to reduce the applied pressure, apply to increase the applied pressure, and hold to maintain the applied pressure at the current level.

For each mode, the hydraulic valves controlling the pressure applied to each wheel are commanded to be open or closed based upon very complex rules that are included in an ABS control algorithm. Due to the complexity of the rules, the tuning of the control parameters included in the ABS control algorithm is very time consuming. Also, switching between the modes can cause the wheel rotational velocity to cycle around a peak tire-to-road friction slip point. While a certain amount of cycling is expected to find the optimal slip point, an excessive amount of cycling, may adversely affect both brake performance and ride quality. Such cycling of the front wheel rotational velocity on a road surface having a high coefficient of friction, or a high mu surface, can result in a very harsh ride. Accordingly, it would be desirable to provide another control algorithm that would minimize the cycling of the wheel rotational velocity during an ABS cycle.

The present invention is directed toward an anti-lock brake system for a vehicle that includes a plurality of apply valves adapted to be connected to a wheel brake cylinder associated with a vehicle wheel and operable to increase the hydraulic brake pressure applied to the associated wheel brake cylinder. The system also includes a plurality of dump valves with each of the dump valves adapted to be connected a wheel brake cylinder associated with a vehicle wheel and operable to decrease the hydraulic brake pressure applied to the associated wheel brake cylinder. The system further includes a plurality of wheel speed sensors with each of the wheel speed sensors associated with each vehicle wheel and an anti-lock brake system controller. The controller is electrically connected to each of the wheel speed sensors and a solenoid coil associated with each of the apply and dump valves. The controller is operable to monitor the wheel speed sensors. Upon determining a potential wheel lock-up situation during a vehicle braking cycle, the controller is further operable to cycle the apply and dump valves associated with the vehicle rear wheels continuously between apply and dump modes to determine an estimated maximum friction wheel slip. The controller then utilizes the estimated maximum friction wheel slip to determine reference velocities for the front vehicle wheels. The reference velocities are compared to the actual front wheel speed and the differences are used to continuously control the apply and dump valves associated with the vehicle front wheels to optimize vehicle braking.

The present invention also contemplates a method for controlling the wheel brakes on a vehicle that includes providing a wheel speed sensor for each vehicle wheel, the wheel speed sensors being operable to monitor the speed of the associated vehicle wheel. The method also contemplates providing an apply valve and a dump valve for each vehicle wheel brake cylinder, the apply valve being operative to allow an increase of the hydraulic brake pressure applied to the wheel brake cylinder and the dump valve being operative to allow a reduction of the hydraulic brake pressure applied to the wheel brake cylinder. Upon determining that a potential wheel lock-up condition exists, the apply and dump valves associated with the vehicle rear wheels are continuously cycled between apply and dump modes to determine an estimated maximum friction wheel slip from the wheel speed sensor data for each of the rear vehicle wheels. A reference velocity for an associated front wheel is then calculated from the estimated maximum friction wheel slip. The calculated reference wheel speed is compared to the actual wheel speed obtained from the associated wheel speed sensor for each wheel. The difference between the reference wheel speed and the actual wheel speed is then used to continuously control the apply and dump valves associated with the front wheels to decelerate the vehicle.

Various objects and advantages of this invention will become apparent to those skilled in the art from the following detailed description of the preferred embodiment, when read in light of the accompanying drawings.

BRIEF DESCRIPTION OF DRAWINGS

FIG. 2.1 is a flow chart for an ABS control algorithm that is in accordance with the invention.

FIG. 2.2 illustrates the relationship between friction and slip for a vehicle wheel as utilized in the algorithm shown in FIG. 2.1.

FIG. 2.3 illustrates the relationship between wheel velocities as a function of time for the algorithm shown in FIG. 2.1.

DETAILED DESCRIPTION

The present invention is directed toward an ABS control algorithm that provides for continuous control of the vehicle wheel brakes in lieu of the prior art control algorithms that generally have fixed time dump and apply pulse durations. The present invention continuously monitors the wheel speeds and uses wheel speed data from each iteration of the control algorithm to update the commands supplied to the solenoid valves in the ABS control valve. Because approximately 70 to 80 percent of vehicle braking is provided by the front brakes, the invention uses the rear wheels to gather information for controlling the front wheel brakes. The control algorithm determines the deceleration of each of the rear wheels and compares the wheel deceleration to the deceleration of the vehicle to determine the rear wheel brake control. The invention contemplates that the operation of the rear wheel brakes during all ABS cycle will continuously oscillate between being in an apply mode and being in a dump mode. As a result of the continuous oscillation between the modes of operation, the speed of the rear wheels will not actually match the vehicle speed; however, the error between the speeds will be relatively small. The oscillatory operation of the rear wheel brakes allows the ABS control algorithm to develop an estimated maximum friction wheel slip. The control algorithm then uses the maximum friction wheel slip to calculate reference velocities for the vehicle front wheels, which are then used to continuously control the front wheel brakes. Thus, the present invention utilizes a form of feedback control. This is quite different from prior art methods of control which utilize a rule based form of control.

Figure 1:
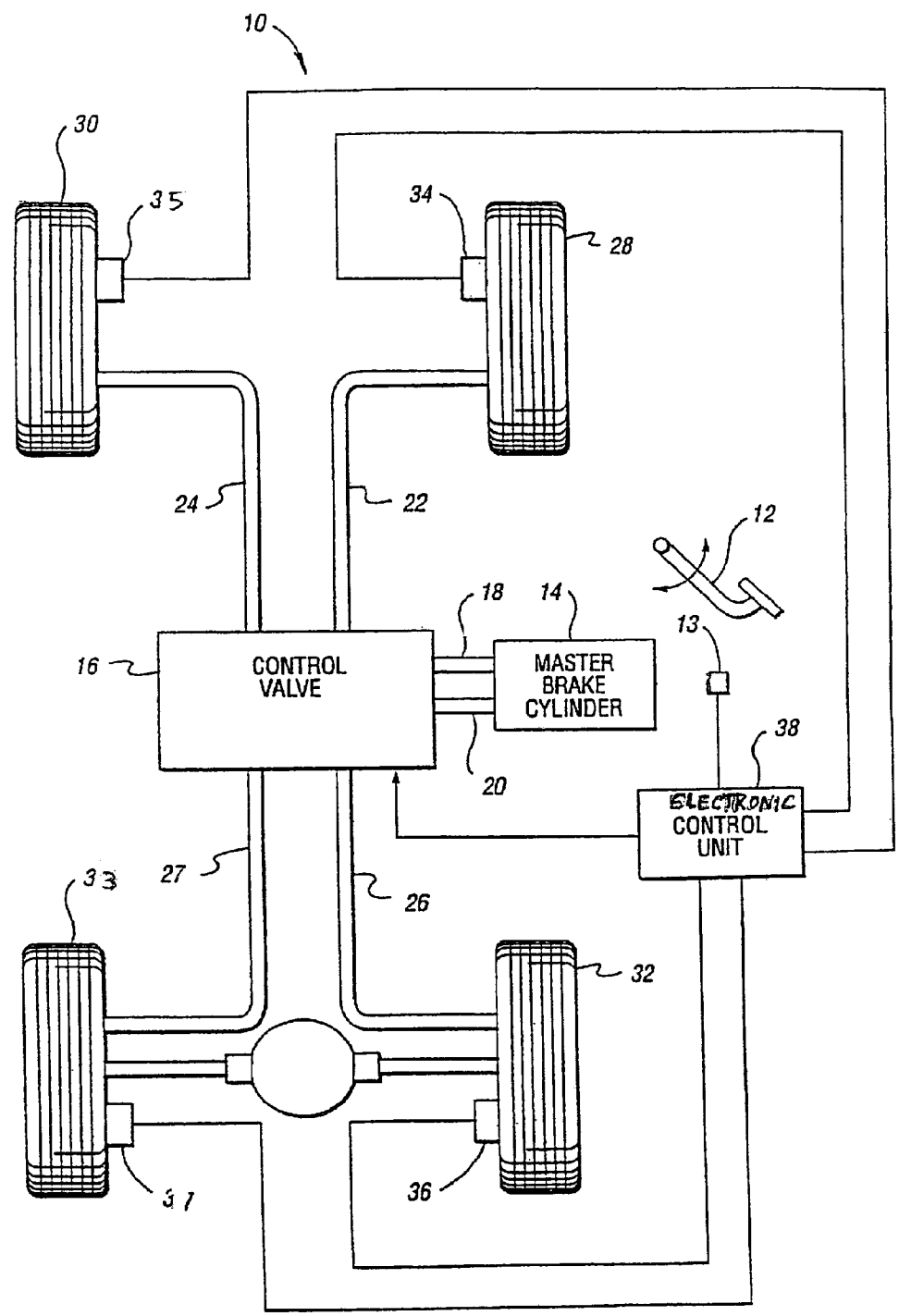
FIG. 1 is a schematic diagram of a vehicle equipped with a known Anti-Lock Brake System (ABS).
Figure 2A:
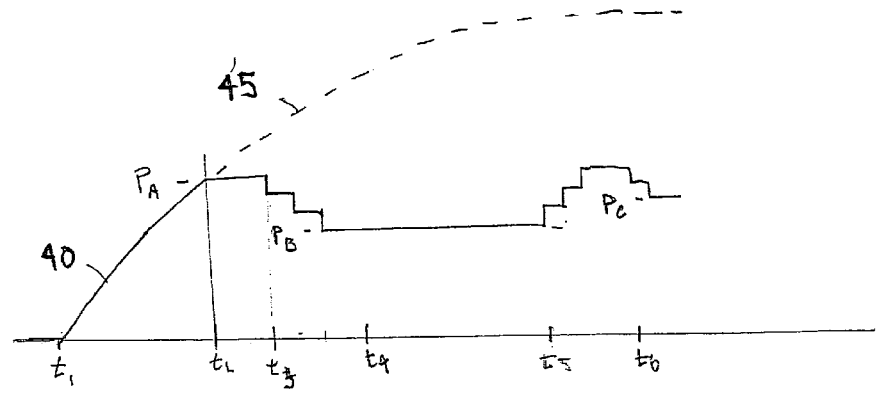
FIG. 2 illustrates the operation of the ABS shown in FIG. 1.
Figure 2B:
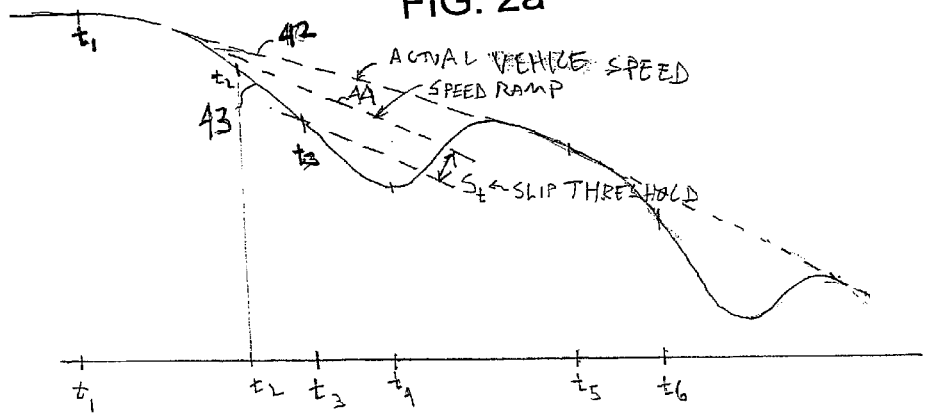
Figure 2C:
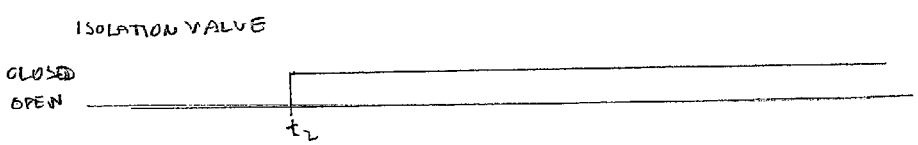
Figure 2D:
Figure 2E:

Referring again to the drawings, there is illustrated in FIG. 2.1 a flow chart for the control algorithm described in the immediately preceding paragraph. Because the invention can be implemented with current vehicle brake system hardware, the numerical identifiers used for the components shown in the prior art brake system illustrated in FIG. 1 that are common with the invention are used in the following description. In functional block 46, the wheel speeds are continuously monitored by the wheel speed sensors 34, 35, 36 and 37. In decision blocks 47A and 47B, a determination is made as to whether a potential wheel lock-up condition is present. Thus, in decision block 47A, the algorithm checks to determine if the brake switch 13 is on, indicating that the brake pedal 12 has been depressed by the vehicle operator. If the brake switch 13 is not on, the algorithm returns to functional block 46 and continues to monitor the brake speeds. If the brake switch 13 is on, the algorithm advances to decision block 47B to determine whether the ABS flag has been set, based upon the sensed wheel speeds. If the ABS flag has not been set, the algorithm returns to functional block 46 and continues to monitor the brake speeds. If the ABS flag has been set, it is an indication that there is potential of one or more wheels locking up and the algorithm advances to functional block 49 to initiate an anti-lock brake cycle.

In functional block 48, the wheel brakes associated with the rear wheels 36 and 37 are continuously oscillated between apply sand dump modes, as will be described in more detail below. The continuous oscillation determines the maximum point upon a curve of wheel friction plotted as a function of wheel slip. A typical wheel friction vs. wheel slip curve is shown in FIG. 2.2. The curve in FIG. 2.2 is applicable to all of the vehicle wheels. As can be seen, as the wheel slip increases, the curve increases with a steep slope, passes though the point of inflection labeled "max", and then falls off. As the slip continues to increase past max, the wheel friction decreases. By continuously cycling the valves controlling the rear wheel brakes between apply and dump modes, the algorithm determines, in functional block 49, the point labeled max in FIG. 2.2 for each of the rear wheels. The point max in FIG. 2.2 is referred to as the maximum friction slip in the following discussion. The dashed horizontal line that is below the max point in FIG. 2.2 represents the average friction value that is utilized by the prior art ABS control algorithms. As can be seen, the operation of the wheel brakes with the present invention utilizes a higher wheel friction factor, which enhances the vehicle braking performance.

The algorithm advances to functional block 50 where it uses the maximum friction slip from functional block 49 to determine a desired front wheel velocity. In the preferred embodiment, the left front desired wheel velocity is determined from data collected from the left rear wheel while the right front desired wheel velocity is determined from data collected from the right rear wheel. A plot of the rear wheel velocity during an ABS braking cycle as a function of time is shown in FIG. 2.3. The points corresponding to the maximum friction slip are labeled manor in FIG. 2.3. The algorithm calculates velocities for the front wheels that lie upon the upper dashed line that is labeled "Vwdf" and passes through the points labeled max. In the preferred embodiment, the dashed line Vwdf is shifted downward in FIG. 2.3 to define a second dashed line labeled Vwdesfront, which represents the desired front wheel velocities for controlling the front wheel brakes. Shifting the line down, moves the maximum friction slip point slightly to the right in FIG. 2.2, where the operation point corresponding to the lower line in FIG. 2.3 is labeled max'. Otherwise, operation upon the point labeled max could cause changes in either direction, and, due to different slopes of the curve on both sides of max in FIG. 2.2, the change when the control moves to the left would be much greater that the same movement to the right. For example, the operating point in FIG. 2.2 corresponding to an equal shift to the left is labeled max" and would result in a line (not shown) below the line labeled Vwdesfront shown in FIG. 2.3. It will be noted that, while max' is slightly less than max, max' is still significantly greater than the friction slip values corresponding to the prior art ABS control algorithm represented by the horizontal dashed line. While the preferred embodiment has been illustrated and described as using max to determine Vwdesfront, it will be appreciated that the invention also may be practiced with desired front wheel velocities obtained utilizing the friction value defined by either max or max". However, because the friction value represented by max" is less than the other possible values, use of max" would result in slightly longer stopping distances.

Once the desired front wheel velocity has been determined, the algorithm advances to decision block 51, where the actual front wheel speed is compared to the desired front wheel speed. If the actual wheel speed is greater than, or equal to, the desired wheel speed, the algorithm transfers to functions block 52A and an apply mode of operation is applied to the front wheel brake to slow the wheel velocity. If, in decision block 51, the actual wheel speed is less than the desired wheel speed, the algorithm transfers to functions block 52B and a dump mode of operation is applied to the front wheel brake to increase the wheel velocity.

Once the front wheel operating mode is selected, the algorithm advances to decision block 53 where it determines whether the ABS braking cycle is completed. The completion can be indicated one of several indicators, such as, for example, not receiving a dump command for a long time period or speed falling to a very low value. If the ABS braking cycle is not completed, the algorithm returns to functional block 48 and continues to cycle the rear wheels to generate a continuously updated desired front wheel speed. Thus, the front wheels also are continuously controlled with the operating mode switching between apply and dump modes as the desired front wheel speed is updated and again compared to the actual front wheel speed. The operation continues until the ABS braking cycle is completed. If, in decision block 53, the ABS braking cycle is completed, the algorithm transfers back to functional block 46 and continues to monitor the individual wheel speeds.

Figure 3:
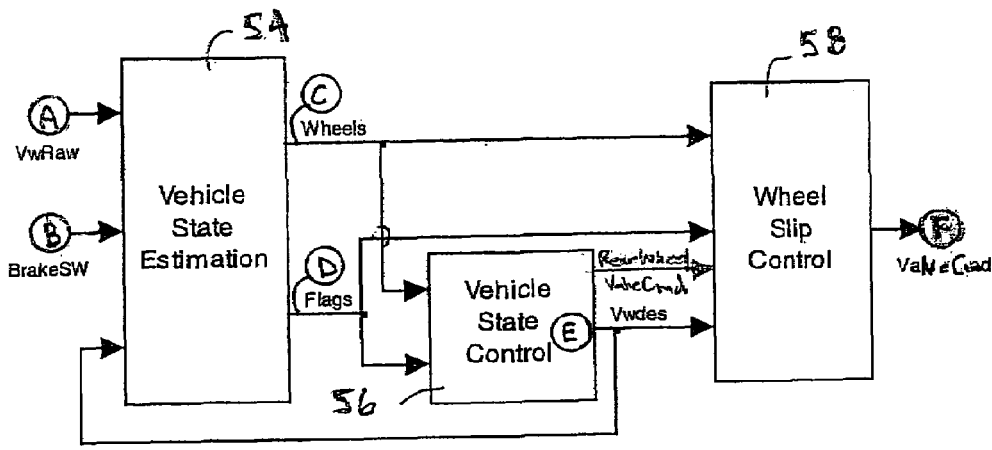
FIG. 3 is a block diagram for an ABS control algorithm that is in accordance with the invention.

Referring again to the drawings, there is illustrated in FIG. 3, a block diagram for an ABS control algorithm that is in accordance with the invention. The invention includes a new algorithm architecture, as shown in FIG. 3. In the following discussion, components that are common with the prior art brake system 10 shown in FIG. 1 have the same numerical designators. The architecture broadly includes a Vehicle State Estimation Block 54 that receives measured raw wheel velocities, which are included as elements of an n-vector labeled VmRaw, where n is the number of controlled vehicle wheels, from each of the wheel speed sensors 34, 35, 36 and 37 associated with the controlled vehicle wheels. The Vehicle State Estimation Block 54 also receives a signal from the brake switch 13 that indicates whether or not the brake pedal 12 is depressed. In the preferred embodiment, a high signal, such as a one, indicates that the ABS is active while a low signal, such as a zero, indicates that the ABS is inactive. As also shown in FIG. 3, the Vehicle State Estimation Block 54 further receives a desired wheel velocity signal, which are included as elements of an n-vector labeled Vwdes, that is fed back from a Vehicle State Control Block 56, that will be described shortly. As will be explained in more detail below, the algorithm contained in the Vehicle State Estimation Block 54 operates upon the input data to generate a vector of vehicle states, which is labeled "wheels" and includes, among other data, the elements of VwRaw. The Vehicle State Estimation Block 54 also supplies the status of flags, such as the ABS activation flag, as another output.

The Vehicle State Control Block 56 includes algorithms that are responsive to the input data to generate control signals, which are included in a vector labeled "RearWheelValveCmd" for the isolation, dump and apply valves associated with the rear wheels. For the preferred embodiment, separate apply and dump solenoid valves are provided for each of the four controlled wheels illustrated in FIG. 1, with the apply valve also functioning as an isolation valve. Accordingly, for the preferred embodiment, the control signal vector would include eight elements for controlling the brake pressure applied to the individual wheel brake cylinders during an ABS braking cycle. Each element would designate the status of the coil associated with the corresponding solenoid valve. In the preferred embodiment, a zero element value would indicate an unactuated coil while a one element value would correspond to an actuated coil. However, it will be appreciated that the invention also can be practiced for other numbers of controlled wheels and other valve configurations. The Vehicle State Control Block 56 also includes an algorithm that calculates desired velocities for each of the front wheels, which are included in a vector labeled Vwdes. The desired wheel velocities are the estimated wheel velocities that maximize the frictional forces between the front tires and the road. The algorithms perform their calculations based upon selected data contained within the vehicle state vector, wheels, and the status of the flags, both of which provide inputs to the block 56.

The third block shown in FIG. 3 is a Wheel Slip Control Block 58. As shown in FIG. 3, the Wheel Slip Control Block 58 receives data contained in the vehicle state vector, wheels, the desired front wheel velocities vector Vwdes and the status of the flags. The Wheel Slip Control Block 58 includes an algorithm that is responsive to the input data to generate control signals, that are included in a Valve Command Vector, ValveCmd, for the isolation, dump and apply valves associated with each of the front wheels. Additionally, the block 58 receives the rear wheel control signals, RearWheelValveCmd; however, the invention contemplates that the block merely combines the rear wheel control signals with the front wheel control signals to form the Valve Command Vector, ValveCmd. Alternately, the rear wheel control signals can be transferred directly from the Vehicle State Control block 56 to the solenoid valves associated with the controlled rear wheels (not shown).

Regardless of the specific valve structure used in the ABS, three operating modes are available for each of the controlled wheel brakes. Either the brake pressure being applied to the wheel brake is being held, decreased or increased. Accordingly, in the following description, the operation of the ABS will be described in terms of hold, dump and apply modes. Therefore, it will be understood that the Valve Command Vectors, ValveCmd and RearWheelValveCmd contain elements that will cause the solenoid valves for each vehicle wheel to cycle between the hold, dump and apply modes, as required by the ABS control algorithm. In the preferred embodiment, there is an apply valve and a dump valve for each of the controlled wheel brakes. There is not a hold valve, instead, the hold mold mode means that neither the apply or dump mode is active and the pressure applied to the wheel brake is held constant.

The invention contemplates that each of the three blocks 54, 56 and 58 shown in FIG. 3 are independent of the other two blocks. This independent definition of the blocks males it very easy to substitute, add or delete sensors, actuators or other vehicle dynamics control fictions. For example, the optimization of the overall vehicle chassis control can be realized by modifying just the Vehicle State Control Block 56. Similarly, for different types of actuators, only the Wheel Slip Control Block 58 needs to be modified. The invention further contemplates that any rule based control of the wheel velocity is minimized. As described above, and illustrated in FIG. 2.1, in each of the dump, apply or hold modes, the rear wheel brake pressure is controlled continuously. During the control, the wheel peak slip that maximizes the tire-to-road friction is estimated. The front wheels are controlled continuously to track the reference velocities, Vwdes. With continuous tracking control, the braking performance of the system is maximized and the vehicle ride quality is significantly improved. Also, the invention can use the same sensors and actuators utilized in prior art ABS's. The details of algorithms contained in each of the blocks 54, 56 and 58 shown in FIG. 3 will be provided in the following paragraphs.

Figure 4:
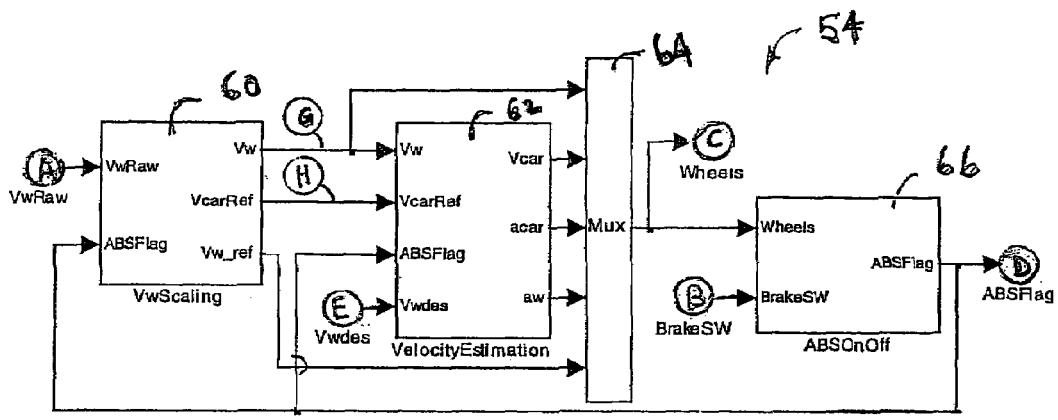
FIG. 4 is a block diagram that illustrates the Vehicle State Estimation block shown in FIG. 3.

The algorithm contained in the Vehicle State Estimation block 54 is illustrated in FIG. 4. The algorithm includes a scaling function for elements of the raw wheel velocities vector VsRaw. The velocity scaling vector is contained in the block 60 labeled "VwScaling" which is shown in the left portions of FIG. 4. As shown in FIG. 4, the scaling block 60 receives the raw wheel velocities directly from the wheel speed sensors associated with the controlled vehicle wheels. The scaling block 60 also receives the status of the ABSFlag. When the ABSFlag status indicates that the ABS is not active, the scaling block 60 is operative to multiply each of the raw velocities by an adaptive scaling factor to convert the raw velocity associated with each controlled wheel into a scaled velocity. While the vehicle is being driven and the ABS is not active, the scaling block 60 compares the four wheel speeds and calculates the adaptive scaling factors that multiply the individual wheel speeds such that the resulting scaled wheel speeds are equal to one another. The scaled wheel velocities are included in an n-element vector labeled Vw. The algorithm in the scaling block 60 also generates a rate limited velocity for each of the controlled vehicle wheels by applying a predetermined velocity rate limit to each of the elements in the scaled wheel velocity vector Vw. In the preferred embodiment, the predetermined velocity rate limit is ±1.1 g; however, it will be appreciated that the invention also may be practiced with other values for the velocity rate limit to include different values for the positive and negative limit value. The limited wheel velocities are included in a vector labeled Vw_ref, which is an n-element vector with each element corresponding to one of the controlled wheels. The algorithm in the scaling block 60 also selects the maximum scaled wheel velocity for use as a vehicle reference VcarRef to estimate the vehicle velocity during deceleration maneuvers. The scaling block 60 sends the vehicle reference velocity VcarRef and limited wheel velocity vector Vw_ref to the block 62 in the center portion of FIG. 4 and which is labeled "VelocityEstimation". The scaling block 62 also sends the scaled wheel velocity vector Vw and the limited wheel velocity vector Vw_ref to the multiplexer block labeled 64 which also is shown in the center portion of FIG. 4.

The VelocityEstimation Block 62 includes an algorithm that receives both the scaled wheel velocity vector Vw and the limited wheel velocity vector Vw_ref directly from the scaling block 60. The block 62 also receives the status of the ABSFlag from the ABSOnOff Block 66 shown in the right portion of FIG. 4 and the desired front wheel velocity vector Vwdes from the Vehicle State Control Block 56. The algorithm in the block 62 is operative to generate an estimated vehicle velocity Vcar and an estimated vehicle acceleration acar which are sent to the Mux block 64. The algorithm also generates a wheel acceleration vector aw which is an n-element vector with each element representing the acceleration of an associated controlled vehicle wheel.

Figure 5:
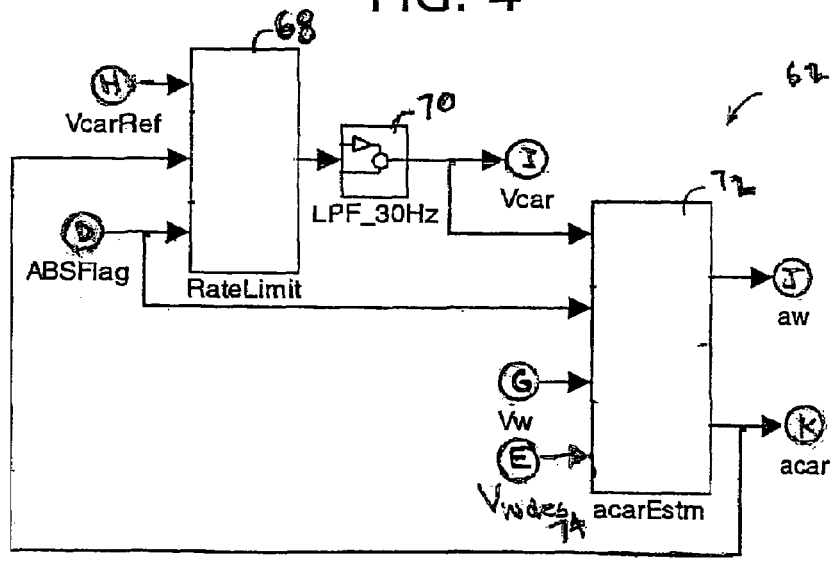
FIG. 5 is a block diagram that illustrates the operation of a velocity estimation algorithm contained in the Velocity Estimation Block shown in FIG. 4.

The operation of the algorithm contained in the VelocityEstimation Block 62 is illustrated in FIG. 5. As shown in FIG. 5, block 62 generates the vehicle velocity vcar by further rate limiting the vehicle reference velocity Vw_ref in block 68 when the ABSFlag status indicates that the ABS is active. Since the time derivative of the vehicle acceleration, or vehicle jerk, is limited, the vehicle acceleration cannot jump. Therefore, the invention contemplates that the lower rate limit of the vehicle velocity Vcar can be changed continuously as a function of the vehicle acceleration, rather than have the limit fixed at friction limit of 1.1 g. Accordingly, the upper rate limit for block 68 is zero, while the lower limit is changed continuously as a function of the estimated vehicle acceleration acar with a cap at the physical limit of friction, e.g., −1.1 g. In the preferred embodiment the lower limit is determined from the relationship (1.3*acar−0.2 g); however, it will be appreciated that other relationships may be used to determine the lower limit. Thus, as shown in FIG. 5, the estimated vehicle acceleration, which is determined in the acarEstm block 72 is supplied to the RateLimit block 68. The limited vehicle velocity is then passed through a low pass filter 70. In the preferred embodiment, the low pass filter 70 has a cut-off frequency of 30 Hz; however, it will be appreciated that the invention also may be practiced with low pass filters having other values for the cut-off frequency. The output of the low pass filter 70 is the estimated vehicle velocity Vcar described above.

The acarEstm block 72, which is shown in the right portion of FIG. 5, contains an algorithm that calculates a value for the vehicle acceleration acar by differentiating and filtering the limited value of the estimated value of vehicle velocity Vcar received from the low pass filter 70. The block 72 also calculates a wheel acceleration vector aw by differentiating and filtering the elements contained in the scaled wheel velocity vector Vw. Additionally, Vsdes is compared to Vw in block 72 to determine the road surface friction condition. This information is used to detect a change in the road surface condition, such as a low to high friction transition, and is included in the vehicle acceleration acar. As shown in FIG. 5, the vehicle acceleration acar is fed back to the RateLimit Block 68 for use in setting the lower rate limit on the estimated vehicle velocity Vcar.

Returning to FIG. 4, the Mux block 64 is operative to combine the inputs of the wheel velocity vectors, Vw and Vw_ref, the wheel acceleration vector aw, and the estimated vehicle velocity and acceleration Vcar and acar into the vehicle status vector, Wheels. The vehicle status vector wheels includes all the data needed by the other components of the ABS control algorithm to generate the valve command vector ValveCmd. The vehicle status vector, Wheels, is sent to both the Vehicle State Control Box 56 and the Wheel Slip Control Box 58, which are shown in FIG. 3. The vehicle status vector, Wheels, also is sent to the ABSOnOff Block 66 shown in the right portion of FIG. 4.

The ABSOnOff Block 66 shown in the right portion of FIG. 4 receives the signal generated by the brake switch 13 when the vehicle brake pedal 12 is depressed at the beginning of the braking cycle. As described above, the block 66 also receives the vehicle status vector wheels. The block 66 contains an algorithm that compares each of the individual scaled wheel velocities to the corresponding rate limited wheel velocity. If any of the individual scaled wheel velocities exceeds the corresponding rate limited wheel velocity by a predetermined threshold amount while the brake pedal 12 is depressed, it is an indication that the wheel is slipping and that there is potential for the wheel to lock-up. Thus, when both of these conditions are present, the algorithm changes the status of the ABSFlag to active. Similarly, when either of criteria is no longer present, the ABSFlag reverts to inactive status.

As described above, the Vehicle State Control Block 56 shown in FIG. 3 includes algorithms that are responsive to the input data to generate control signals for the solenoid valves associated with each of the rear wheels to cycle between the dump, apply and hold modes. In each mode, the valves are controlled continuously as a function of the vehicle states. The algorithms for controlling the left and right wheels are identical and independent of each other. Depending upon the vehicle, the lower value of the rear wheel control commands may be applied to both of the rear wheels to reduce the yaw moment of the vehicle.

Figure 6:
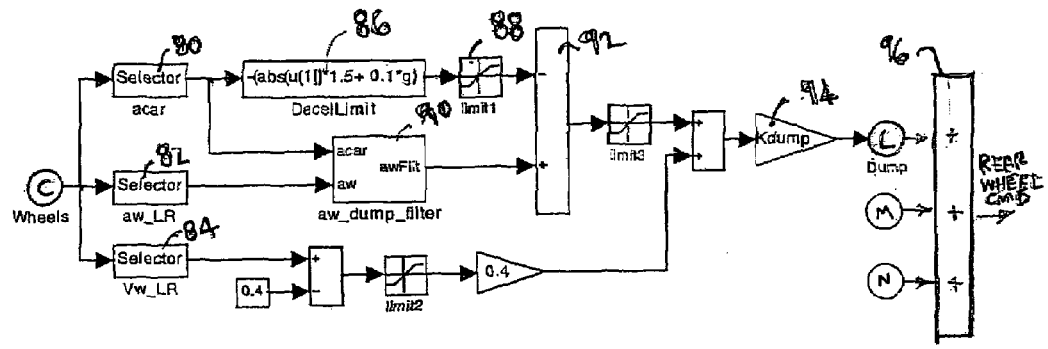
FIG. 6 is a block diagram that illustrates the operation of a rear wheel dump control algorithm contained in the Vehicle State Control Block shown in FIG. 3.

The operation of the algorithm for implementing the dump mode for the left rear vehicle wheel 37 is shown in FIG. 6. As shown in FIG. 6, the algorithm receives the vehicle state vector, Wheels. The selectors labeled 80, 82 and 84 select the data concerning the estimated vehicle acceleration acar, the wheel acceleration for the left rear wheel, aw_LR, and the filtered wheel velocity for the left rear wheel, Vw_LR, respectively, from the vehicle state vector, Wheels, for ether processing. The dump mode algorithm has a primary path that is shown in the upper portion of FIG. 6. The primary path generates a dump command that is proportional to the difference between a filtered wheel acceleration, awFilt, and a dump mode reference wheel acceleration. The dump mode reference wheel acceleration is a function of the estimated vehicle acceleration acar in accordance with the following relationship:

Dump mode reference wheel acceleration=1.5*acar−0.1 g., where acar is always <0.0 since the vehicle is decelerating during a braking cycle.

The dump mode reference wheel acceleration is determined in the block labeled 86 in FIG. 6. A limiter 88 labeled "limit1" assures that the output of block 86 does not exceed predetermined values. The left rear wheel acceleration aw_LR is passed through a low pass filter 90 having a cutoff frequency that is a function of the vehicle acceration acar. The dump mode reference wheel acceleration is subtracted from aw_LR in block 92 and the difference is limited by the limiter labeled "limit3". The output from limit3 is applied to amplifier 94 where a proportionality constant Kdump is applied to provide the dump command. The specific value for Kdump is selected for the particular vehicle and is tuned to correspond to vehicle parameters. The signal applied to the dump valve solenoid coil is proportional to the dump command generated by the dump mode algorithm illustrated in FIG. 6. The dump command is limited to a negative value and as long as the dump command is present, the apply command, which is described below, is suspended. The dump command is then combined with the other rear wheel commands, which are described below, in summing block 96 to form the rear wheel command vector, RearWheel ValveCmd.

To avoid false deactivation of the ABS due to the left rear wheel locking on a low friction surface, a secondary dump algorithm is included in the rear wheel control algorithm. The secondary dump algorithm is shown in the lower portion of FIG. 6 and is implemented only when the wheel velocity is below 0.4 m/sec. The secondary dump algorithm generates a negative component that is combined with the output of the second limiter in the primary path to increase the signal applied to the amplifier 94. The resulting incremental change in the dump command reduces the possibility of the wheel locking up at the end of the ABS braking cycle.

Figure 7:
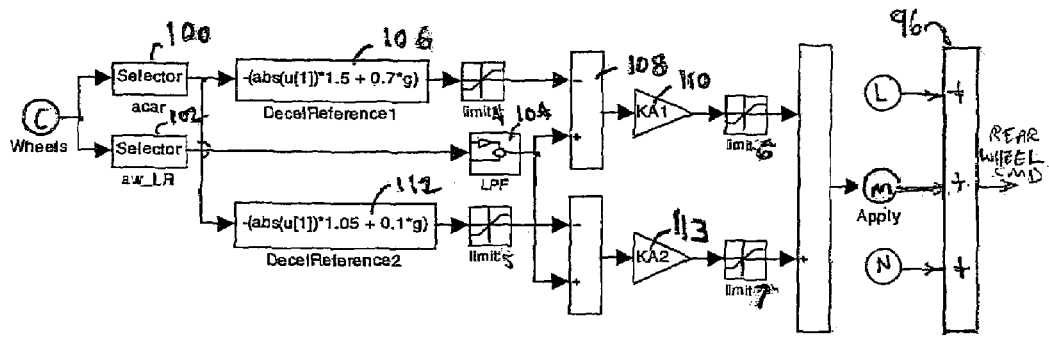
FIG. 7 is a block diagram that illustrates the operation of a rear wheel apply control algorithm contained in the Vehicle State Control Block shown in FIG. 3.

The operation of the algorithm for implementing the apply mode for the left rear vehicle wheel 37 is shown in FIG. 7. As shown in FIG. 7, the apply algorithm receives the vehicle state vector, Wheels. The selectors labeled 100 and 102 select the data concerning the estimated vehicle acceleration acar and the wheel acceleration for the left rear wheel, aw_LR respectively, from the vehicle state vector wheels for further processing. As also shown in FIG. 7, the apply algorithm includes two proportional control paths. Similar to the dump mode algorithm, the apply mode algorithm has a primary path that is shown in the upper portion of FIG. 7. The upper path includes a gain scheduled low pass filter block 104 that filters the left rear wheel acceleration aw_LR. The upper path also generates an apply mode reference acceleration in the block labeled 106. The apply mode reference acceleration is a function of the estimated vehicle acceleration acar with the relationship defined by:

Apply mode reference acceleration=1.5*acar−0.7 g, where, as before, acar is always <0.0 since the vehicle is decelerating during a braking cycle.

After passing through the limiter labeled "limit4", the limited apply mode reference acceleration is subtracted from the filtered left rear wheel acceleration aw_LR in block 108. The resulting difference is then multiplied by the proportionality constant KA1 in the amplifier 110 and passes though a final limiter labeled "limit6" to provide the apply command. The final limiter limit6 blocks negative values, so that only positive values are provided for the apply command. The apply command is then combined with the other rear wheel commands in summing block 96 to form the rear wheel command vector, RearWheel ValveCmd. Because the apply mode reference acceleration is always lower than the dump mode reference acceleration, the cycling of the control modes back and forth between the apply and dump modes is guaranteed.

A secondary path, shown in the lower portion of FIG. 7, is implemented only during the beginning of the apply mode to speed the build up of the brake pressure. The secondary path adds a second component to the apply command. Similar to the primary path, the second component is proportional to the difference between the filtered left rear wheel acceleration aw_LR and a second apply mode reference acceleration. The second apply mode reference acceleration generated in the block labeled 112 and is a function the estimated vehicle acceleration acar with the relationship defined by:

Second apply mode reference acceleration=1.05*acar +0.1 g.

Additionally, the second apply mode reference acceleration is limited to remain within the range of zero to −0.2 g by the limiter labeled "limit5". The difference between the filtered left rear wheel acceleration aw_LR and the second apply mode reference acceleration is multiplied by the proportionality constant KA2 in the amplifier 113 and passes though a final limiter labeled "limit7" to provide the apply command. The final limiter limit7 blocks negative values, so that only positive values are provided from the secondary path for the apply command.

Figure 8:
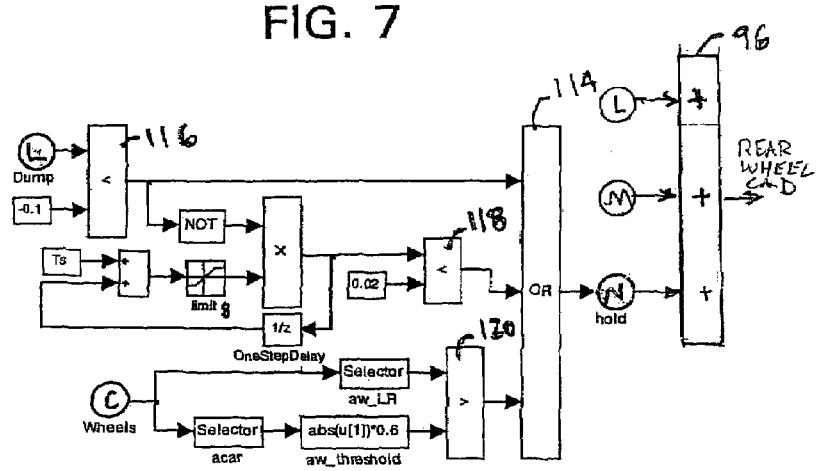
FIG. 8 is a block diagram that illustrates the operation of a rear wheel hold control algorithm contained in the Vehicle State Control Block shown in FIG. 3.

In order to avoid sneak down of the wheel velocities, or the premature cycling of the dump and apply modes, it is necessary to hold the brake pressure at a constant level after the dump mode is finished. The apply mode starts only after the hold mode is finished. The basic structure of the hold mode algorithm is illustrated in FIG. 8. The hold mode is active when any of the three inputs to the OR Gate 114 is high. The first input goes high when decision block 116 determines that the dump command generated by the dump mode algorithm illustrated in FIG. 6 is less than 0.1, which indicates that the dump mode is still active. The second input to the Or Gate 114 goes high when decision block 118 determines that the dump mode has been deactivated for less than 0.02 sec. Thus, the hold mode is activated immediately upon the termination of the dump mode. Finally, the hold mold is initiated when the filtered left rear wheel acceleration aw_LR exceeds a predetermined threshold, which, in the preferred embodiment, is |acar|*0.6. Upon any of the above three conditions being met, the OR Gate 114 causes the ABS control algorithm to close the associated valves in the control valve 16 to maintain the pressure applied to the controlled rear wheel brake at the present level. The output of the hold mode algorithm is combined with the other rear wheel commands in summing block 96 to form the rear wheel command vector, RearWheel ValveCmd.

Considering now the control of the front wheel brakes, the front wheel brake control algorithm is composed of two sub-functions, the derivation of a desired wheel velocity for each of the front wheels 28 and 30 and a front wheel velocity tracking control. As described above, the desired front wheel velocity is determined in the Vehicle State Control Block 56 shown in FIG. 3 and the values are included in desired wheel velocity vector Vwdes that is generated by the Vehicle State Control Block 56. As also described above, the front wheel velocity tracking control is generated in the Wheel Slip Control Block 58 shown in FIG. 3 with the control values included in the valve command vector ValveCmd.

Figure 9:
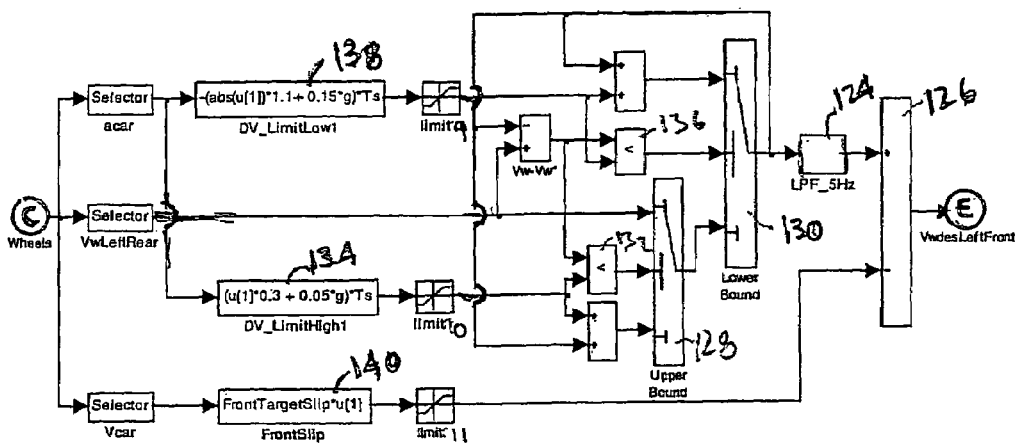
FIG. 9 is a block diagram that illustrates the operation of a front wheel desired velocity derivation algorithm contained in the Vehicle State Control Block shown in FIG. 3.

The basic structure of the desired front wheel velocity algorithm is illustrated in FIG. 9 for the left front vehicle wheel 30. As with the rear wheel control algorithms, the desired front wheel velocity algorithm for the right front vehicle wheel 28 is identical to the structure shown in FIG. 9. The desired left front wheel velocity, VwdesLeftFront, is derived by rate limiting an associated rear wheel velocity. In the preferred embodiment, the left rear wheel velocity, VwLeftRear, is used. The limited velocity is filtered in block 124 by a low pass filter. In the preferred embodiment, the low pass filter cutoff frequency is five Hertz; however, the invention also can be practiced with other values for the cutoff frequency. The signal coming out of the filter block 124 corresponds to the upper dashed line that is labeled Vwdf in FIG. 2.3 and represents operation at the maximum point max of the friction slip curve shown in FIG. 2.2. A further wheel slip, that is descried below, is combined with the filtered and limited rear wheel velocity in summing block 126. The subtracted result is the desired left front wheel velocity, VwdesLeftFront and corresponds to the shifted dashed line labeled Vwdesfront in FIG. 2.3. As shown in FIG. 9, as long as the left rear wheel velocity, VwLeftRear, remains within the limiting bounds, the left rear wheel velocity, VwLeftRear, will be selected by the upper bound switch 128 and the lower bound switch 130 and passed through to the low frequency filter 126. The upper bound switch 128 is controlled by decision block 132 where the difference between the current left rear wheel velocity, VwLeftRear, and the one step previous rate limited left rear wheel velocity, Vw*, is continuously compared to an upper limit, DV_LimitHigh1, generated by the block labeled 134 as a function of acar. Upon the left rear wheel velocity rate exceeding the upper limit, a value that is the sum of the upper limit and Vw* is supplied to the filter block 124. Similarly, the lower bound switch 130 is controlled by decision block 136 where the difference between the current left rear wheel velocity, VwLeftRear, and the one step previous rate limited left rear wheel velocity, Vw*, is continuously compared to a lower limit, DV_LimitLow1, generated by the block labeled 138 as a function of acar. Upon the left rear wheel velocity rate falling below the lower limit, a value that is the sum of the lower limit and Vw* is supplied to the filter block 124. During an ABS braking cycle, the upper and lower rate limits are continuously changed as functions of the estimated vehicle acceleration. The relationships are given by the following formulas:

Upper limit=(0.3*acar+0.05 g)*(control sampling time); and

Lower limit=−(abs(1.1*acar)+0.15 g)*(control sampling time).

The additional slip added in summing block 126 to the filtered and limited rear wheel velocity is determined in the block labeled 140 as a proportional function of the estimated vehicle velocity Vcar. The relationship is given by:

Additional slip=(FrontTargetSlip)*Vcar

The front target slip, FrontTargetSlip, is a predetermined percentage selected for the particular vehicle. For the test vehicle described below, a value of 0.05 was used.

Figure 10:
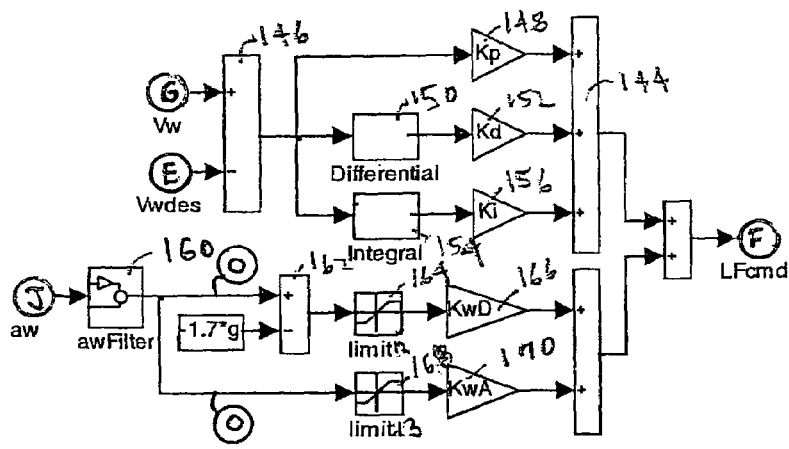
FIG. 10 is a block diagram that illustrates the operation of a front wheel velocity tracking algorithm contained in the Wheel Slip Control Block shown in FIG. 3.

The actual control vector for the left front wheel is derived by a wheel control algorithm having the structure shown in FIG. 10. The algorithm consists of a PID type feed back controller shown in the upper portion of the figure and a feed forward controller shown in the lower portion of the figure. During an ABS braking cycle, the algorithm continuously monitors the filtered wheel acceleration aw. When the filtered wheel acceleration aw is within a range bounded by zero and −1.7 g, the left front wheel brake command, LFcmd, is derived solely by the PID controller. It will be appreciated that while −1.7 g is used for the lower bound, the invention also can be practiced with other values for the lower bound. The command generated by the PED controller is the sum of three components in the summing block labeled 144. One of the components is directly proportional to the difference, or error, between the filtered left front wheel velocity, Vw, and the desired left front wheel velocity, VwdesLeftFront, as determined by the algorithms shown in FIG. 9. The difference is determined by the subtraction block labeled 146 and the proportionality constant Kp is applied to the difference by the amplifier labeled 148. The second command component is proportional to the differential of the difference and is generated by the output of the differentiator block labeled 150 being passed through the Kd amplifier labeled 152. Similarly the third command component is proportional to the integral of the difference and is generated by the output of the integrator block labeled 154 being passed through the Ki amplifier labeled 156.

Since the desired front wheel velocities, Vwdes, are at the peak friction point of the friction-slip curve, the front wheel velocities migrate to an unstable portion of the friction-slip curve. The unstable portion of the friction-slip curve is defined as the region where the increased wheel slip reduces the frictional force between the wheel and the surface. Therefore, when the filtered wheel acceleration aw is outside the range bounded by zero and −1.7 g, the left front wheel brake command, LFcmd, is supplemented by the addition of another component derived by the feed forward controller shown in the lower portion of FIG. 10. The component added by the feed forward controller is proportional to filtered wheel acceleration, awFilter. The filtering is provided by the filter labeled 160 which will be described below. The added component includes a dump element and an apply element. The dump element is derived from the difference between the filtered wheel acceleration, awFilter, and 1.7 g, as shown by the subtraction block labeled 162. The resulting difference is limited to range bounded by [−10 g, 0] by the limiter labeled 164. The limited difference is then multiplied by the proportionality constant KwD in amplifier block 166. The resulting product is then added to the command vector LFcmd. The apply element is directly proportional to the limited filtered wheel acceleration. The limiter is labeled 168 and has a range bounded by [0, 10 g]. The limited wheel acceleration is then multiplied by the proportionality constant KaA in amplifier block 170. The resulting product is then added to the command vector LFcmd. The specific ranges for the limiters 164 and 168 given above are for the preferred embodiment. It will be appreciated that the invention also can be practiced utilizing ranges for the limiters 164 and 168 that are different from those given above.

Figure 11:
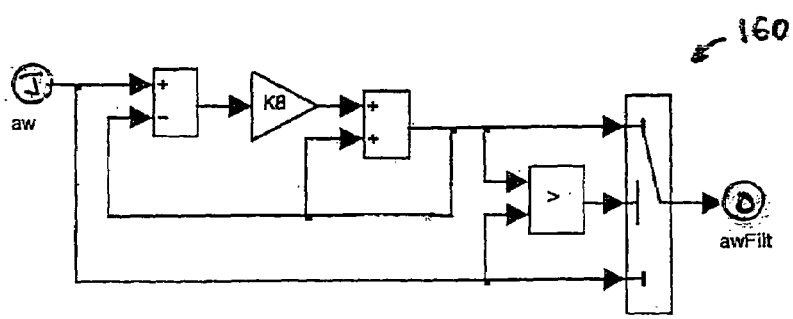
FIG. 11 is a block diagram that illustrates the operation of a front wheel acceleration filter algorithm contained in the front wheel velocity tracking algorithm shown in FIG. 10.

Excessive filtering of the wheel acceleration aw in the feed forward controller can lead to excessive dumping to brake pressure applied to the front wheel brakes, which, in turn, may cause a significant reduction in brake performance. However, some filtering of the wheel acceleration is desired to reject noise that can activate brake line hydraulic dynamics. Accordingly, an asymmetric wheel acceleration filter is used in the filter block 160. The asymmetric filter is illustrated in FIG. 11 and is operative to take the maximum value of the raw wheel acceleration and the low pass filtered one. This asymmetric filtering prevents overdumping due to the lag of the low pass filtering. Therefore, the feed forward controller, shown in the lower portion of FIG. 10, stops dumping the front wheel brake pressure immediately after the wheel acceleration is recovered to the value above the threshold, set to −1.7 g in FIG. 10, while suppressing any faulty activation of the feed forward control due to any noise present upon the wheel acceleration signal.

Figure 12:
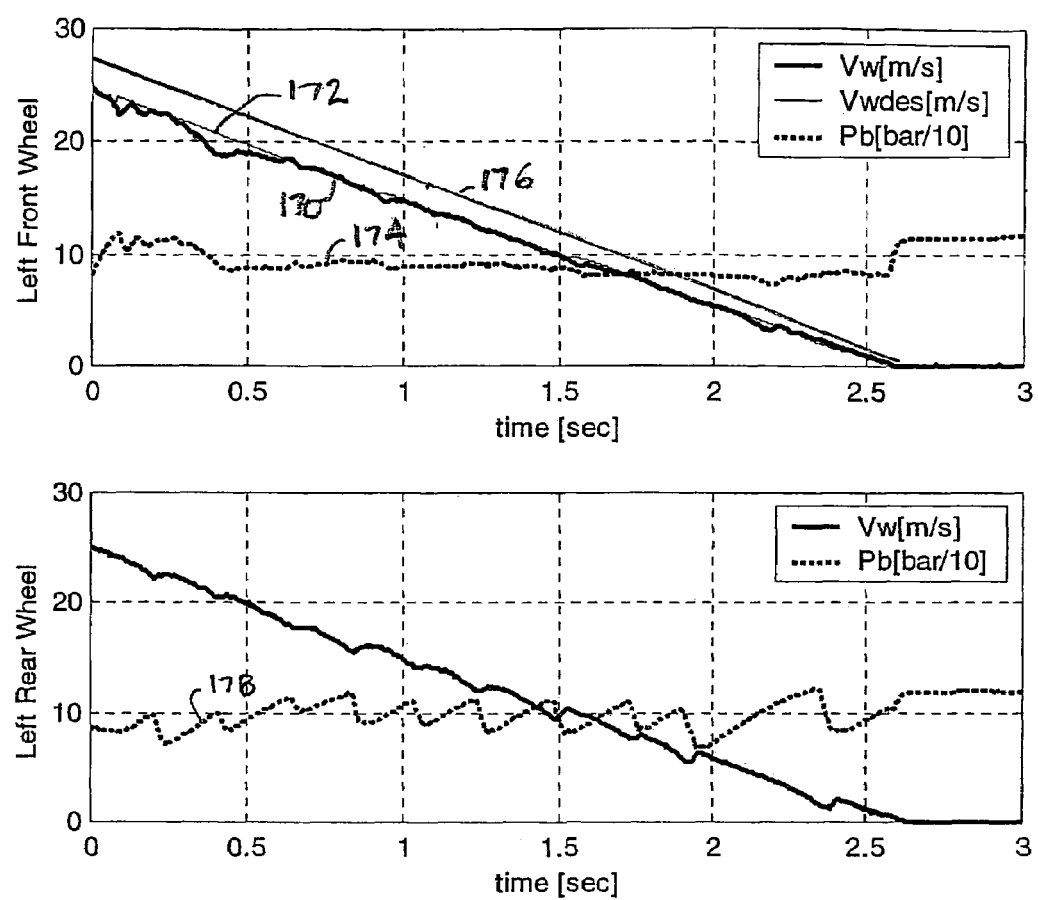
FIG. 12 illustrates the operation of the left front and left rear wheel brakes during a stop on a high friction surface while under the control of the ABS control algorithm shown in FIG. 3.

The ABS control algorithm described above was implemented upon a rear wheel drive passenger vehicle. The graphs in FIG. 12 illustrate the operation of the algorithm for the left and front and rear wheels during an ABS braking cycle on a road surface having a high coefficient of friction, with the upper graph representing the left front wheel and lower graph representing the left rear wheel. Upon such a high friction road surface, heavy shifting of the vehicle weight to the front wheels occurs. Accordingly, any fluctuation of the pressure applied to the front wheel brakes is very critical in determining the vehicle ride quality during an ABS braking cycle. As FIG. 12 shows, the left front wheel velocity, which is shown by the bold solid line 170, matches the desired wheel velocity 172, shown by the solid line, very closely, while the pressure applied to the left front wheel brake, shown by the dashed line 174 is essentially constant during the braking cycle. In the preferred embodiment, the actual vehicle speed, as shown by the line labeled 176, is about ten percent greater than the actual slightly greater than the front wheel speed. Thus, as the braking cycle continues, the actual vehicle speed 176 approaches the actual front wheel speed 170. The front brake pressure 174 remains at an essentially a constant value even though the pressure 178 applied to the left rear wheel brake is cycling as the operation of the rear wheel brake oscillates between the apply and dump modes. Accordingly, the front wheel velocity and the pressure applied to the associated wheel brake are maintained either at, or very near to, the peak friction slip point. Therefore, both the vehicle stopping distance and ride quality are significantly improved over that obtained with prior art ABS algorithms.

Contrary to prior art rule based ABS control algorithms, the present invention is composed mostly of mathematical functions of the vehicle states. Therefore, the number of parameters that need to be tuned is reduced significantly. Also maximizing the braking performance with smooth ride quality is realized by the continuous control of the front wheel velocities at the peak friction slip point. While the preferred embodiment of the invention has been illustrated and described above, it will be appreciated that invention also can be practiced with other values than those shown. Accordingly, other threshold values may be utilized for the limiters and other multiples of g can be substituted for those that are shown. Similarly, the ABS can be tuned by varying the gains for the amplifiers.

While the preferred embodiment of the invention has been illustrated and described, it will be appreciated that the block diagrams shown in the figures are exemplary. Accordingly, the invention also can be practiced with other configurations for the algorithms included within the Vehicle State Estimation Block 54 than those shown in FIGS. 4 and 5. Similarly, other configurations may be substituted for the specific algorithms included within the Vehicle State Control Block 56 than those shown in FIGS. 6 through 9. Likewise, other configurations may be substituted for the specific algorithms included within and the Wheel Slip Control Blocks 58 than those shown in FIGS. 10 and 11.

The principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described for an anti-lock brake system, it will be appreciated that the invention also can be included in traction control and vehicle stability systems.

What is claimed is:

1. An anti-lock brake system for a vehicle comprising:
   a plurality of apply valves, each of said apply valves adapted to be connected to a wheel brake cylinder associated with a vehicle wheel, each of said apply valves operable to increase the hydraulic brake pressure applied to said associated wheel brake cylinder;
   a plurality of dump valves, each of said dump valves adapted to be connected to a wheel brake cylinder associated with a vehicle wheel, each of said dump valves operable to decrease the hydraulic brake pressure applied to said associated wheel brake cylinder;
   a plurality of wheel speed sensors, each of said wheel speed sensors associated with each vehicle wheel; and
   a brake system controller electrically connected to said wheel speed sensors and a solenoid coil associated with each of said apply and dump valves, said controller including an algorithm and operable to monitor said wheel speed sensors and, upon determining a potential wheel lock-up situation during a vehicle braking cycle, said controller being further operable to cycle the apply and dump valves associated with the vehicle rear wheels continuously between apply and dump modes to determine an estimated maximum friction wheel slip and then to utilize said estimated maximum friction wheel slip to determine reference velocities that are used to continuously control the apply and dump valves associated with the vehicle front wheels to optimize vehicle braking.

2. The brake system according to claim 1 wherein the front wheel reference velocities are determined from a reduced value of said estimated maximum friction wheel slip.

3. The brake system according to claim 2 wherein said brake controller holds the pressure applied to each rear brake constant for a predetermined time period following each dump cycle, whereby wheel speed sneak down is prevented.

4. The brake system according to claim 3 wherein the rear brake pressure is held following a dump cycle when the acceleration of the wheel associated with the rear brake is greater than 0.6 times the absolute value of the acceleration of the vehicle.

5. The brake system according to claim 3 wherein the braking of the left front wheel is controlled by data obtained from the left rear wheel and the braking of right front wheel is controlled by data obtained from the right rear wheel.

6. The brake system according to claim 3 wherein the braking of the both front wheels is controlled by lower of the data obtained from the left and right rear wheels.

7. The brake system according to claim 5 wherein said front wheel reference velocities are limited as a function of the vehicle acceleration.

8. The brake system according to claim 7 wherein said front wheel reference velocities are contained with the limits of:

$$1.1*acar - 0.15*g < \text{reference velocity} < 0.3*acar + 0.05*g;$$

where acar = the acceleration of the vehicle.

9. The brake system according to claim 7 wherein the braking of the each of the front wheels is controlled by comparing said reference wheel velocity determined for the wheel to an actual wheel velocity and generating a wheel brake command that is a function of the difference between said reference and actual wheel velocities.

10. The brake system according to claim 9 wherein said brake system controller includes an algorithm that combines proportional, integral and differential control to generate said wheel brake command when the front wheel acceleration is within an acceleration range between $-1.7*g$ and zero.

11. The brake control system according to claim 10 wherein said brake system controller is operative to add a component to said wheel brake command that is continuous function of the front wheel acceleration when said wheel acceleration is outside of said acceleration range.

12. The brake system according to claim 10 wherein the system is included in a traction control system.

13. The brake system according to claim 10 wherein the system is included in a vehicle stability control system.

14. An anti-lock brake system for a vehicle comprising:
a plurality of apply valves, each of said apply valves adapted to be connected to a wheel brake cylinder associated with a vehicle wheel, each of said apply valves operable to increase the hydraulic brake pressure applied to said associated wheel brake cylinder;
a plurality of dump valves, each of said dump valves adapted to be connected to a wheel brake cylinder associated with a vehicle wheel, each of said dump valves operable to decrease the hydraulic brake pressure applied to said associated wheel brake cylinder;
a plurality of wheel speed sensors, each of said wheel speed sensors associated with each vehicle wheel;
a vehicle brake switch, said brake switch adapted to be coupled to the vehicle brake system and operable to generate a brake activation signal upon actuation of the vehicle brake system by the vehicle operator;
a vehicle state estimator, said vehicle state estimator connected to said wheel speed sensors and said brake switch; said vehicle state estimator responsive to wheel speed information received from said wheel speed sensors and said brake activation signal to generate a vehicle status vector and an anti-lock brake system activation status flag;
a vehicle state controller, said vehicle state controller connected to said vehicle state estimator and receiving said vehicle status vector and said anti-lock brake system activation status flag therefrom; said vehicle state controller responsive to said vehicle status vector and said anti-lock brake system activation status flag to generate commands for controlling said apply and dump valves associated with the vehicle rear wheel brakes, said vehicle state controller also responsive to said vehicle status vector and said anti-lock brake system activation status flag to generate desired wheel velocities for each of the vehicle front wheels as a function of rear wheel condition data included in said vehicle status vector, said vehicle state controller supplying said desired wheel velocities to said vehicle state estimator; and
a wheel slip controller connected to said vehicle state estimator and said vehicle state controller, said wheel slip controller receiving said vehicle status vector and said anti-lock brake system activation status flag from said vehicle state estimator and said desired front wheel velocities from said vehicle state controller, said wheel slip controller responsive to said vehicle status vector, said anti-lock-brake system activation status flag and said desired front wheel velocities to generate commands for continuously controlling said apply and dump valves associated with the vehicle front wheel brakes.

15. An anti-lock brake system for a vehicle comprising:
a plurality of apply valves, each of said apply valves adapted to be connected to a wheel brake cylinder associated with a vehicle wheel, each of said apply valves operable to increase the hydraulic brake pressure applied to said associated wheel brake cylinder;
a plurality of dump valves, each of said dump valves adapted to be connected to a wheel brake cylinder associated with a vehicle wheel, each of said dump valves operable to decrease the hydraulic brake pressure applied to said associated wheel brake cylinder;
a plurality of wheel speed sensors, each of said wheel speed sensors associated with each vehicle wheel;
a vehicle brake switch, said brake switch adapted to be coupled to the vehicle brake system and operable to generate a brake activation signal upon actuation of the vehicle brake system by the vehicle operator;
a vehicle state estimator, said vehicle state estimator connected to said wheel speed sensors and said brake switch; said vehicle state estimator responsive to wheel speed information received from said wheel speed sensors and said brake activation signal to generate a vehicle status vector and an anti-lock brake system activation status flag;
a vehicle state controller, said vehicle state controller connected to said vehicle state estimator and receiving said vehicle status vector and said anti-lock brake system activation status flag therefrom; said vehicle state controller responsive to said vehicle status vector and said anti-lock brake system activation status flag to generate commands for controlling said apply and dump valves associated with the vehicle rear wheel brakes, said vehicle state controller also responsive to said vehicle status vector and said anti-lock brake system activation status flag to generate desired wheel velocities for each of the vehicle front wheels and said vehicle state controller is further responsive, upon determining a potential wheel lock-up situation exists, to continuously cycle the apply and dump valves associated with the vehicle rear wheels between apply and dump modes to determine an estimated maximum friction wheel slip from the wheel speed sensor data for each of the rear vehicle wheels, said vehicle state controller operable to use said estimated maximum friction wheel slip to calculate said desired velocities for the vehicle front wheels, said vehicle state controller supplying said desired wheel velocities to said vehicle state estimator; and a wheel slip controller connected to said vehicle state estimator and said vehicle state controller, said wheel slip controller receiving said vehicle status vector and said anti-lock brake system activation status flag from said vehicle state estimator and said desired front wheel velocities from said vehicle state controller, said wheel slip controller responsive to said vehicle status vector, said anti-lock brake system activation status flag and said front desired wheel velocities to generate commands for continuously controlling said apply and dump valves associated with the vehicle front wheel brakes.

16. The brake system according to claim 15 wherein the calculation of the front wheel desired velocities are determined from a reduced value of the estimated maximum friction wheel slip.

17. The brake system according to claim 16 wherein the system is included in a traction control system.

18. The anti-lock brake system according to claim 16 wherein the system is included in a vehicle stability control system.

* * * * *